(12) United States Patent
Ko

(10) Patent No.: US 10,249,154 B1
(45) Date of Patent: Apr. 2, 2019

(54) INDICATING/ALARMING APPARATUS

(71) Applicant: Chun-Min Ko, Taichung (TW)

(72) Inventor: Chun-Min Ko, Taichung (TW)

(*) Notice: Subject to any disclaimer, the term of this patent is extended or adjusted under 35 U.S.C. 154(b) by 0 days.

(21) Appl. No.: 16/126,279

(22) Filed: Sep. 10, 2018

(30) Foreign Application Priority Data

Sep. 11, 2017 (TW) .............................. 106131017 A

(51) Int. Cl.
*G08B 5/36* (2006.01)
*F21V 8/00* (2006.01)

(52) U.S. Cl.
CPC .............. *G08B 5/36* (2013.01); *G02B 6/006* (2013.01); *G02B 6/0036* (2013.01); *G02B 6/0055* (2013.01); *G02B 6/0061* (2013.01); *G02B 6/0083* (2013.01)

(58) Field of Classification Search
CPC ...... G08B 5/36; G02B 6/0036; G02B 6/0055; G02B 6/006; G02B 6/0061; G02B 6/0083
See application file for complete search history.

(56) References Cited

U.S. PATENT DOCUMENTS

| | | | | |
|---|---|---|---|---|
| 6,286,970 | B1* | 9/2001 | Egawa | G02B 6/0028 362/556 |
| 9,016,923 | B2* | 4/2015 | Kosaka | G02B 6/008 362/613 |
| 9,274,265 | B2* | 3/2016 | Sakai | G02B 6/0016 |
| 10,030,846 | B2* | 7/2018 | Vasylyev | F21V 7/0091 |
| 2001/0005315 | A1* | 6/2001 | Suzuki | G02B 6/0086 362/613 |
| 2018/0031875 | A1* | 2/2018 | Qin | G02B 6/0036 |
| 2018/0203180 | A1* | 7/2018 | Horner | G02B 6/0073 |

* cited by examiner

*Primary Examiner* — Mohamed Barakat
(74) *Attorney, Agent, or Firm* — Muncy, Geissler, Olds & Lowe, P.C.

(57) ABSTRACT

The invention discloses an indicating/alarming apparatus which includes an optically transparent polymer plate, a light-shielding layer, a flexible circuit board, a plurality of light-emitting devices and a light-reflecting layer. The light-shielding layer is formed to overlay an upper surface of the optically transparent polymer plate. The plurality of light-emitting devices are soldered on the flexible circuit board. The flexible circuit board is mounted on a lower surface of the optically transparent polymer plate such that the plurality of light-emitting devices are disposed within an opening formed on the lower surface of the optically transparent polymer plate. Each light-emitting device emits a light entering from a light incident face of the opening into the optically transparent polymer plate which guides, due to total reflection, the light to exit from a top side surface, a bottom side surface, a first edge surface, a second edge surface and sites on surfaces whose total reflection is broken. The light-reflecting layer is formed to overlay the lower surface of the optically transparent polymer plate to reflect the light.

10 Claims, 12 Drawing Sheets

INDICATING/ALARMING APPARATUS

CROSS-REFERENCE TO RELATED APPLICATION

This utility application claims priorities to Taiwan Application Serial Number 106131017, filed Sep. 11, 2017, which is incorporated herein by reference.

BACKGROUND OF THE INVENTION

1. Field of the Invention

The invention relates to an indicating/alarming apparatus, and in particular, to a flexible indicating/alarming apparatus.

2. Description of the Prior Art

As for the prior arts of the indication/alarming apparatuses, the prior arts mostly use hard and thick transparent acrylic plates as light-guiding plates, and light-emitting diode devices. The light-emitting diode device emits a light entering from the side surface of the hard and thick transparent acrylic plate into the transparent acrylic plate. The light is guided by the hard and thick transparent acrylic plate to exit from the front surface of the transparent acrylic plate. The pattern representative of c to indication or alarming is exhibited by sticking colored cellophanes on the front surface of the hard and thick transparent acrylic plate. For example, the structure of current escape indicator is identical to those of the prior arts mentioned above.

However, the indication/alarming apparatus of the prior art is not flexible and has limited range of applications. In addition, the pattern of the indication/alarming apparatus of the prior art is exhibited by the light-shielding layer, and the area of other region other than the pattern, which the light exits from, is larger than that of the pattern. By contrast, and the contrast between the pattern and other region is smaller.

SUMMARY OF THE INVENTION

Accordingly, one scope of the invention is to provide a flexible indicating/alarming apparatus to broaden application range thereof. Moreover, the indicating/alarming apparatus according to the invention is modified to exhibit the pattern by the light-exiting region to enhance the contrast between the pattern and other region.

An indicating/alarming apparatus according to a first preferred embodiment of the invention includes an optically transparent polymer plate, a light-shielding layer, a flexible circuit board, a plurality of light-emitting devices and a light-reflecting layer. The optically transparent polymer plate has an upper surface, a lower surface opposite to the upper surface, a top side surface, a bottom side surface opposite to the top side surface, a first edge surface, a second edge surface opposite to the first edge surface, and an opening formed on the lower surface. The opening is adjacent to the top side surface, and has a light incident face. The light-shielding layer is formed to overlay the upper surface of the optically transparent polymer plate. The plurality of light-emitting devices are soldered on the flexible circuit board. The flexible circuit board is mounted on the lower surface of the optically transparent polymer plate such that the plurality of light-emitting devices are disposed within an opening formed on the lower surface of the optically transparent polymer plate. Each light-emitting device emits a light entering from the light incident face of the opening into the optically transparent polymer plate which guides the light to exit from the top side surface, the bottom side surface, the first edge surface, the second edge surface and sites on the upper surface and the lower surface whose total reflection is broken. The light-shielding layer and the light reflecting layer are formed to respectively overlay the upper surface and lower surface of the optically transparent polymer board, and protect the optically transparent polymer board from decay induced by sunshine and failure induced by external force.

In on modification of the invention, the upper surface of the optically transparent polymer plate thereon defines a first light-exiting region. The light-shielding layer overlays the upper surface other than the first light-exiting region of the optically transparent polymer plate. The light is guided by the optically transparent polymer plate to also exit from the first light-exiting region.

Further, the lower surface of the optically transparent polymer plate thereon defines a second light-exiting region. The light-reflecting layer overlays the lower surface other than the second light-exiting region of the optically transparent polymer plate. The light is guided by the optically transparent polymer plate to also exit from the second light-exiting region.

In one embodiment, the first light-exiting region and the second light-exiting region respectively extend along the first edge surface, the bottom side surface and the second edge surface of the optically transparent polymer plate.

In one embodiment, the first edge surface, the bottom side surface and the second edge surface of the optically transparent polymer plate respectively form a curved surface.

In one embodiment, the first light-exiting region corresponds to a pattern. The optically transparent polymer plate has a plurality of recesses corresponding to the pattern. Each recess has a respective depth. The depths of the recesses adjacent to the light-emitting devices are shallower than those of the recesses depart from the light-emitting devices. The difference in the depth of the recesses is to control the amount of light exiting to make light exiting regarding each glyph or pattern uniform.

In one embodiment, the light-shielding layer can be formed of a dark ink layer, a leather layer, a wood layer, a first metal layer, a first polymer layer and so on.

In one embodiment, the light-reflecting layer can be formed of a light ink layer, a second metal layer, a second polymer layer and so on.

In one embodiment, each the light-emitting device can be a semiconductor light-emitting diode device or an organic light-emitting diode device.

Distinguishable from the prior arts, the indicating/alarming apparatus according to the invention can expand application range thereof. Moreover, the indicating/alarming apparatus according to the invention is modified to exhibit the pattern by the light-exiting region to enhance the contrast between the pattern and other region.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
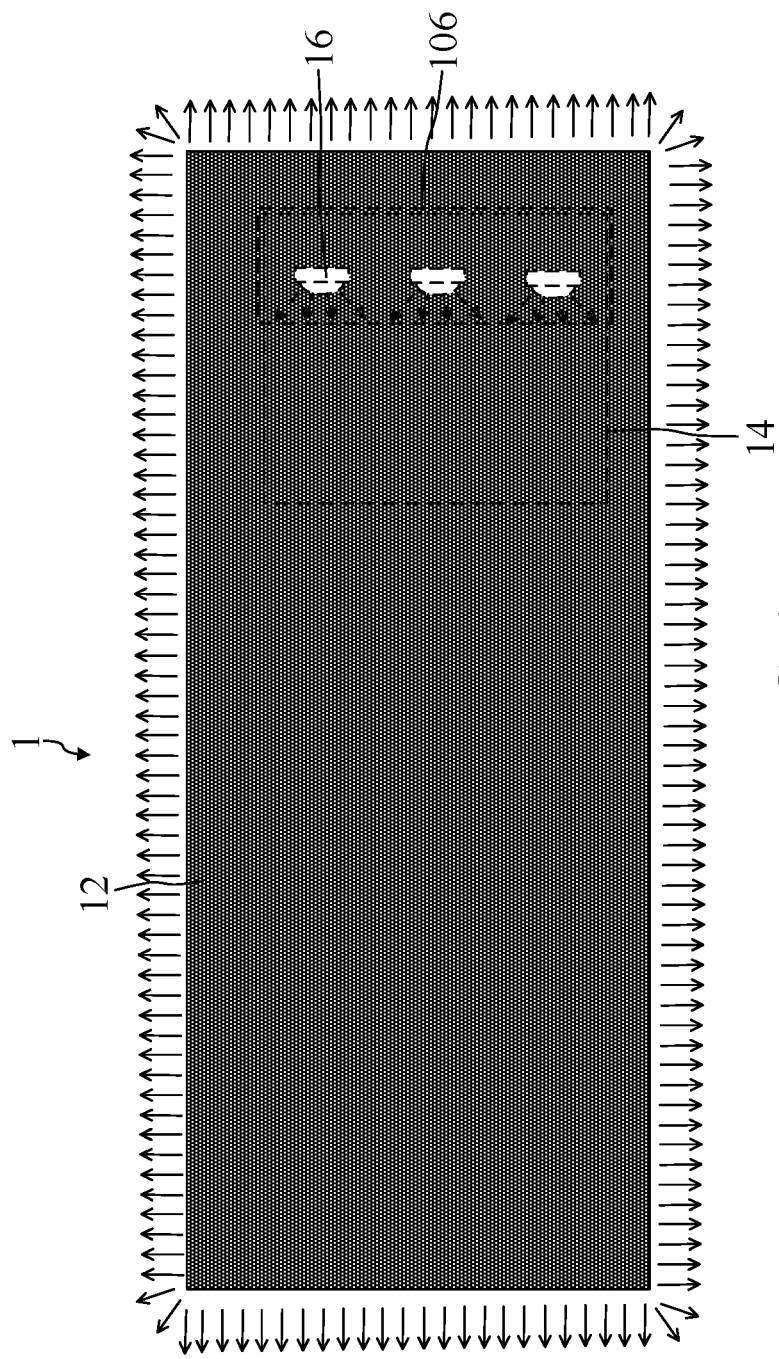
FIG. 1 is a top view of an indicating/alarming apparatus according to a preferred embodiment of the invention.
Figure 2:
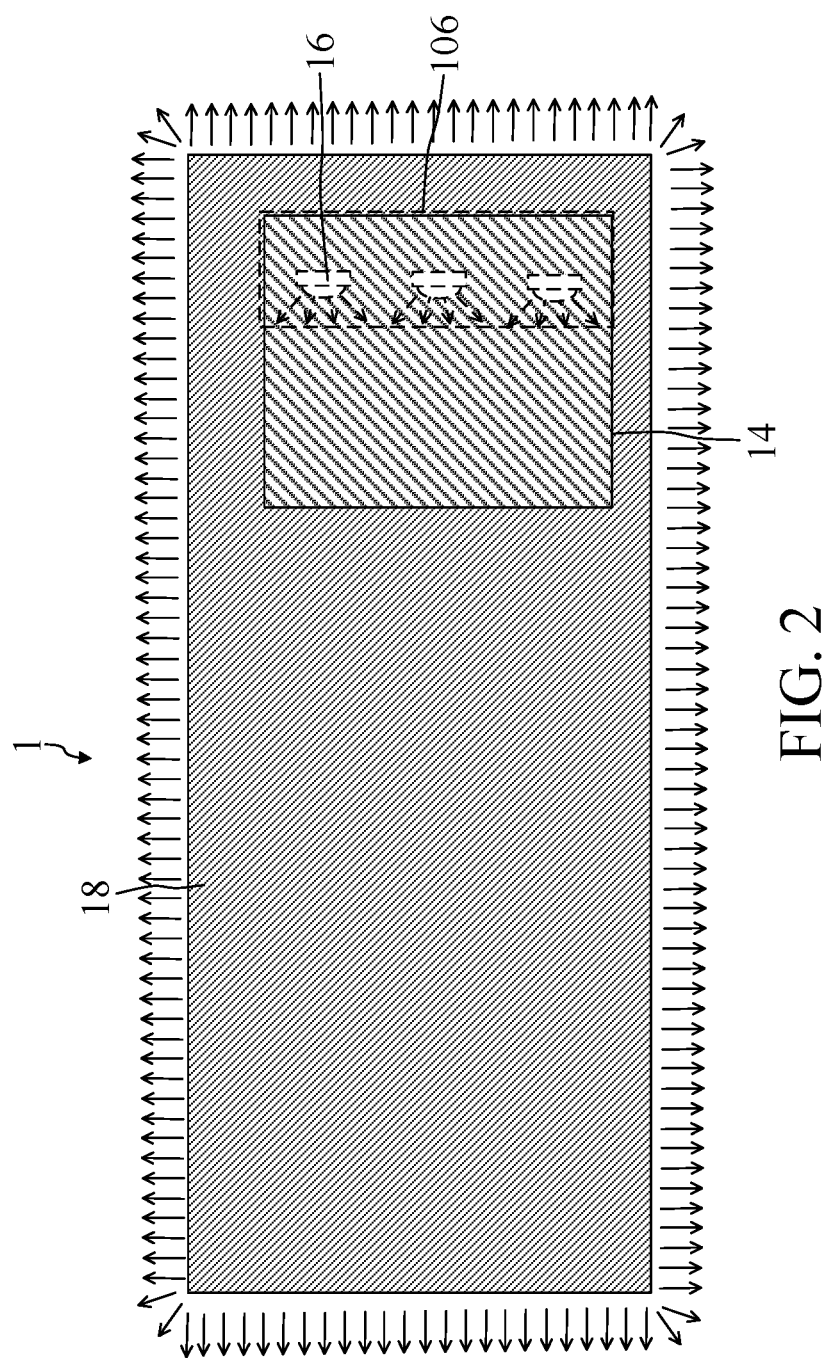
FIG. 2 is a bottom view of the indicating/alarming apparatus according to the preferred embodiment of the invention.
Figure 3:
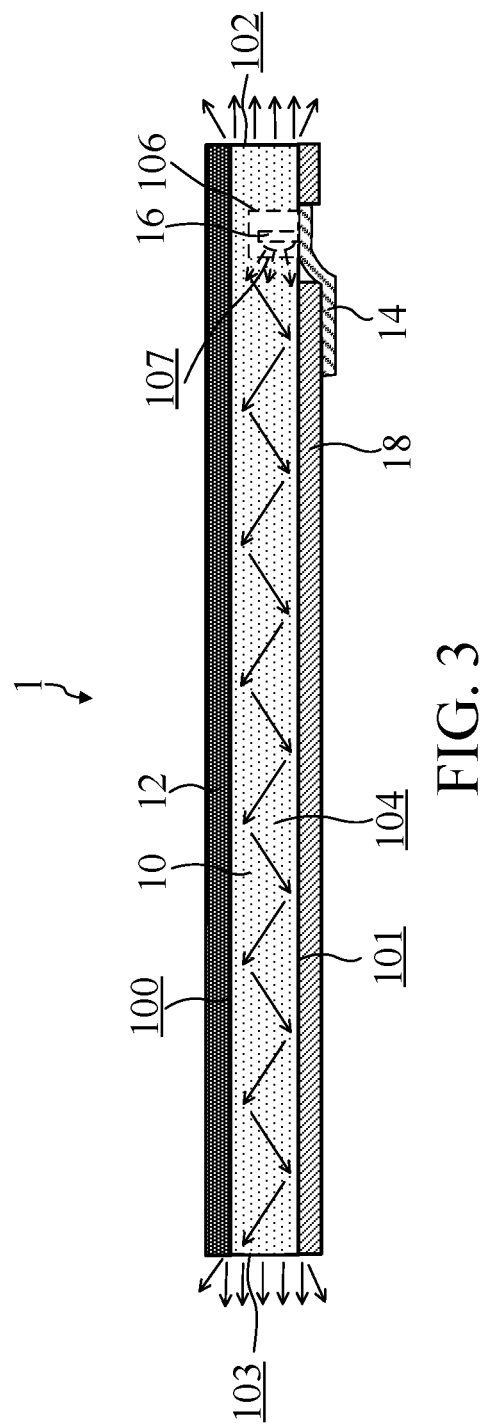
FIG. 3 is a side view of the indicating/alarming apparatus according to the preferred embodiment of the invention.
Figure 4:
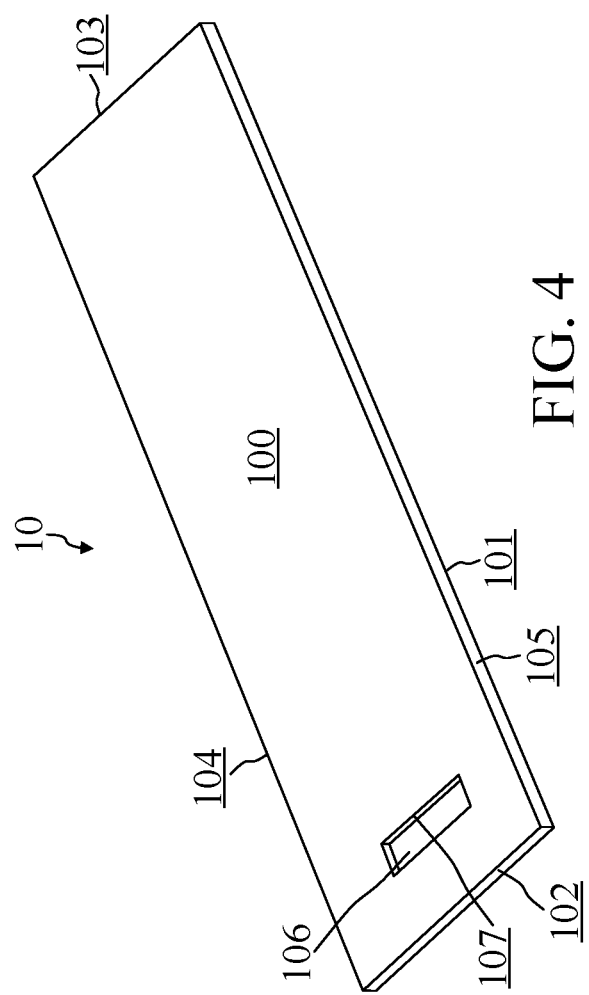
FIG. 4 is a perspective view of an optically transparent polymer plate, an essential component of the indicating/alarming apparatus according to the preferred embodiment of the invention.

Referring to FIGS. 1 to 4, those drawings schematically illustrate an indicating/alarming apparatus 1 according to a preferred embodiment of the invention. FIG. 1 schematically illustrates with a top view the indicating/alarming apparatus 1 according to the preferred embodiment of the invention. FIG. 2 schematically illustrates with a bottom view the indicating/alarming apparatus 1 according to the preferred embodiment of the invention. FIG. 3 schematically illustrates with a side view the indicating/alarming apparatus 1 according to the preferred embodiment of the invention. FIG. 4 schematically illustrates with a perspective view an optically transparent polymer plate 10, an essential component of the indicating/alarming apparatus 1 according to the preferred embodiment of the invention.

As shown in FIGS. 1, 2 and 3, the indicating/alarming apparatus 1 according to the preferred embodiment of the invention includes an optically transparent polymer plate 10, a light-shielding layer 12, a flexible circuit board 14, a plurality of light-emitting devices 16 and a light-reflecting layer 18.

As shown in FIG. 4, the optically transparent polymer plate 10 has an upper surface 100, a lower surface 101 opposite to the upper surface 100, a top side surface 102, a bottom side surface 103 opposite to the top side surface 102, a first edge surface 104, a second edge surface 105 opposite to the first edge surface 104, and an opening 106 formed on the lower surface 101. The opening 106 is adjacent to the top side surface 102, and has a light incident face 107.

In one embodiment, the optically transparent polymer plate 10 can be formed of polymethylmethacrylate (PMMA), silicone, polycarbonate (PC), thermoplastic polyurethane (TPU), polystyrene (PS), MMA Styrene copolymer (MS), or other commercial light-guiding polymers. The thickness of the optically transparent polymer plate 10 can be determined as needed, and is not particularly limited.

As shown in FIG. 3, the light-shielding layer 12 is formed to overlay the upper surface 100 of the optically transparent polymer plate 10. The plurality of light-emitting devices 16 are soldered on the flexible circuit board 14. The flexible circuit board 14 is mounted on the lower surface 101 of the optically transparent polymer plate 10 such that the plurality of light-emitting devices 16 are disposed within an opening 106 formed on the lower surface 101 of the optically transparent polymer plate 10. Each light-emitting device 16 emits a light entering from the light incident face 107 of the opening 106 into the optically transparent polymer plate 10 which guides the light to exit from the top side surface 102, the bottom side surface 103, the first edge surface 104 and the second edge surface 105. The light-shielding layer 12 blocks the light from exiting from the optically transparent polymer plate 10.

The light-reflecting layer 18 is formed to overlay the lower surface 101 of the optically transparent polymer plate 10, and is for reflecting the light incident to the light-reflecting layer 18. In the example shown in FIG. 2, the flexible circuit board 14 is mounted on light-reflecting layer 18. In another example, the flexible circuit board 14 is previously mounted on the lower surface 101 of the optically transparent polymer plate 10, and then the light-reflecting layer 18 overlays the flexible circuit board 14.

In one embodiment, the light-shielding layer 12 can be formed of a dark ink layer, a leather layer, a wood layer, a first metal layer, a first polymer layer and so on.

In one embodiment, the light-reflecting layer 18 can be formed of a light ink layer, a second metal layer, a second polymer layer and so on.

In one embodiment, each the light-emitting device 16 can be a semiconductor light-emitting diode device or an organic light-emitting diode device.

Figure 5:
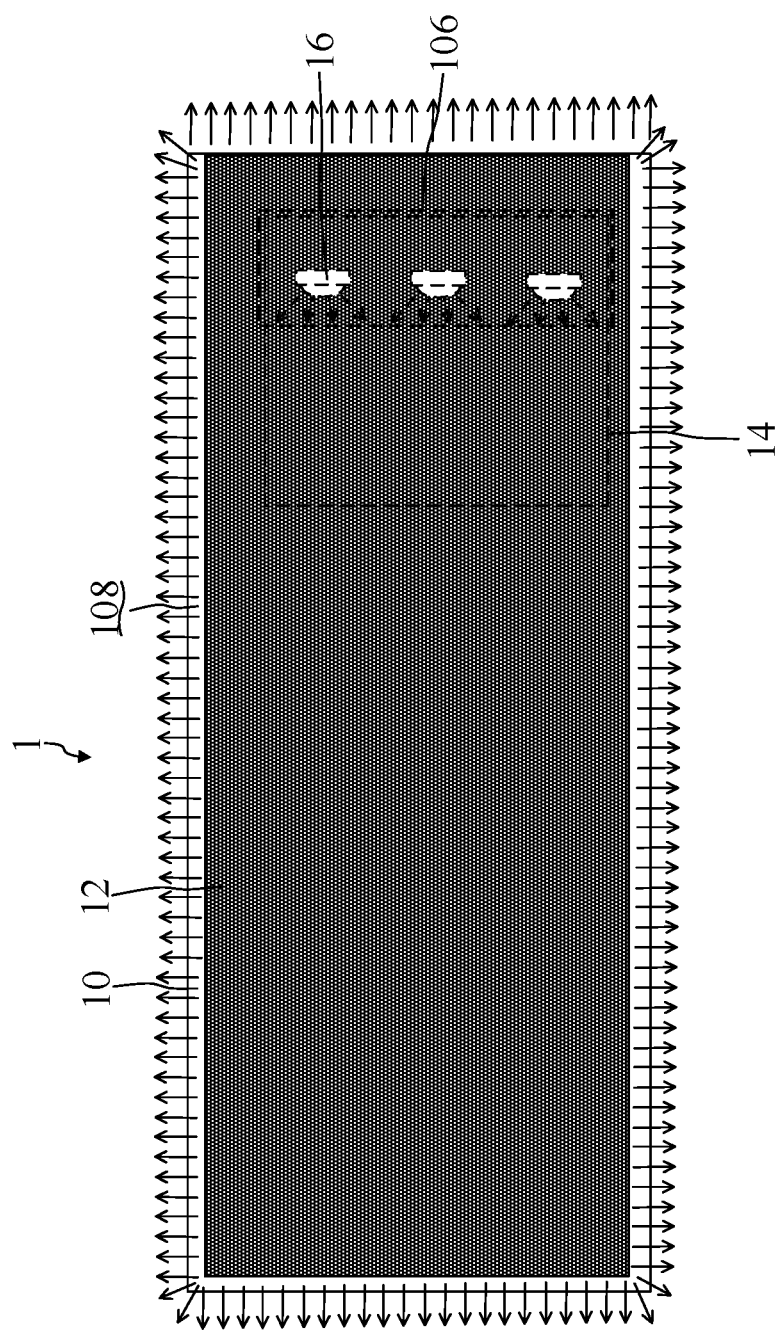
FIG. 5 is a top view of a modification of the indicating/alarming apparatus according to the preferred embodiment of the invention.
Figure 6:
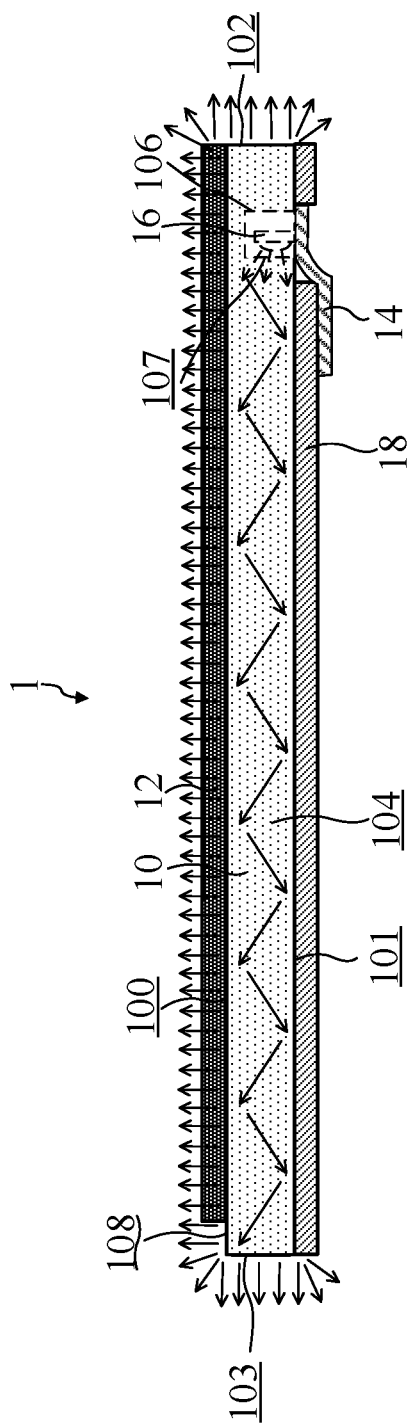
FIG. 6 is a side view of the modification of the indicating/alarming apparatus according to the preferred embodiment of the invention.

Referring to FIGS. 5 and 6, those drawings schematically illustrate a modification of the indicating/alarming apparatus 1 according to the preferred embodiment of the invention. FIG. 5 schematically illustrates with a top view the modification of the indicating/alarming apparatus 1 according to the preferred embodiment of the invention. FIG. 6 schematically illustrates with a side view the modification of the indicating/alarming apparatus 1 according to the preferred embodiment of the invention.

As shown in FIGS. 5 and 6, the upper surface 100 of the optically transparent polymer plate 10 thereon defines a first light-exiting region 108. The light-shielding layer 12 overlays the upper surface 100 other than the first light-exiting region 108 of the optically transparent polymer plate 10. The light is guided by the optically transparent polymer plate 10 to also exit from the first light-exiting region 108. The components and devices in FIGS. 5 and 6 identical to those shown in FIGS. 1 and 3 are given the same numerical notations, and will be not described in detail herein.

Also as shown in FIGS. 5 and 6, in one embodiment, the first light-exiting region 108 extends along the first edge surface 104, the bottom side surface 103 and the second edge surface 105 of the optically transparent polymer plate 10.

Figure 7:
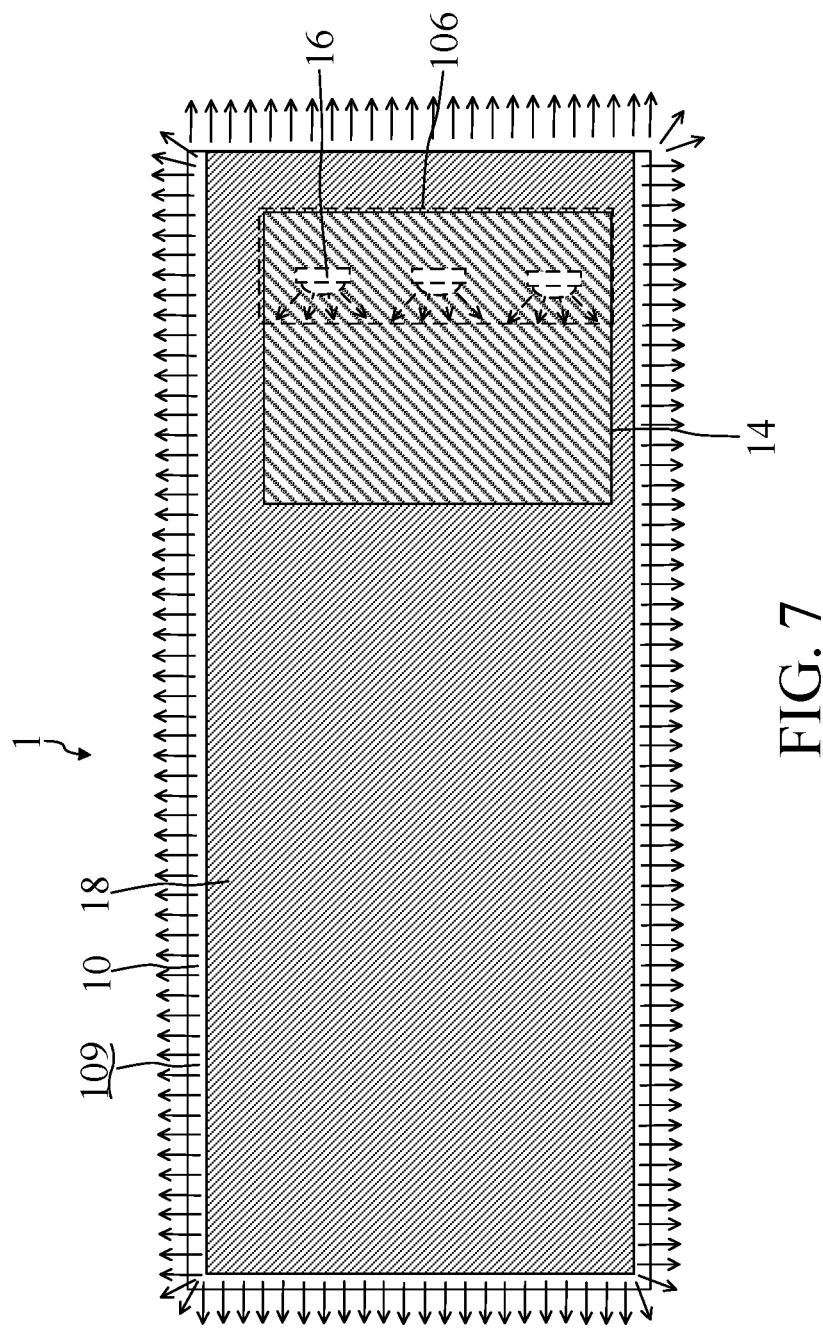
FIG. 7 is a bottom view of another modification of the indicating/alarming apparatus according to the preferred embodiment of the invention.
Figure 8:
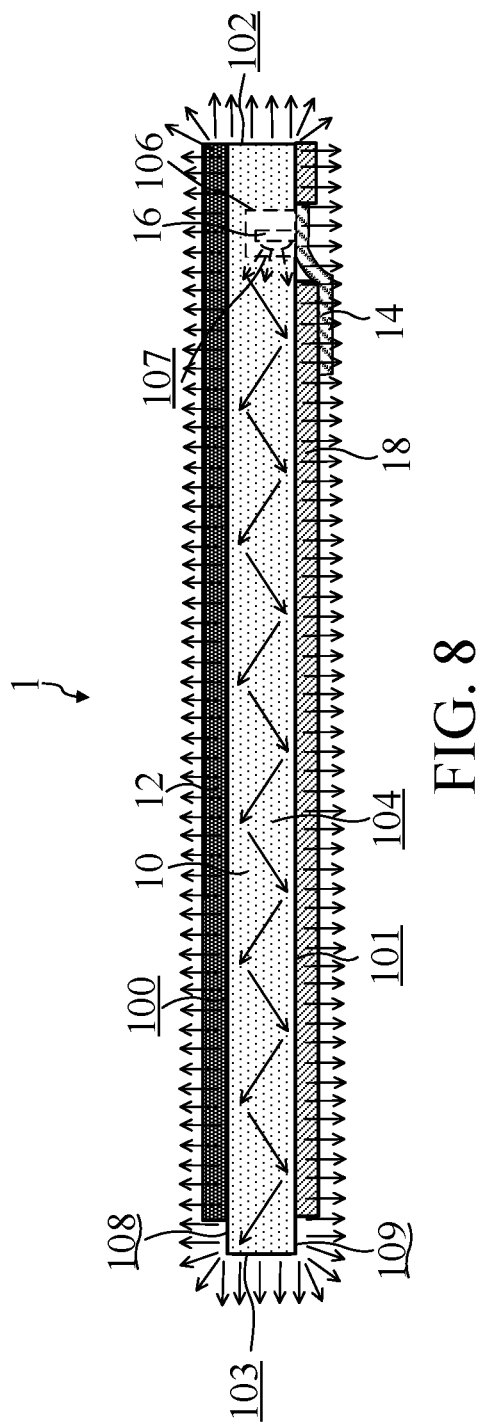
FIG. 8 is a side view of another modification of the indicating/alarming apparatus according to the preferred embodiment of the invention.

Referring to FIGS. 7 and 8, those drawings schematically illustrate another modification of the indicating/alarming apparatus 1 according to the preferred embodiment of the invention. FIG. 7 schematically illustrates with a bottom view another modification of the indicating/alarming apparatus 1 according to the preferred embodiment of the invention. FIG. 8 schematically illustrates with a side view another modification of the indicating/alarming apparatus 1 according to the preferred embodiment of the invention.

As shown in FIGS. 7 and 8, the lower surface 101 of the optically transparent polymer plate 10 thereon defines a second light-exiting region 109. The light-reflecting layer 18 overlays the lower surface 101 other than the second light-exiting region 109 of the optically transparent polymer plate 10. The light is guided by the optically transparent polymer plate 10 to also exit from the second light-exiting region 109. The components and devices in FIGS. 7 and 8 identical to those shown in FIGS. 2 and 3 are given the same numerical notations, and will be not described in detail herein.

Also as shown in FIGS. 7 and 8, in one embodiment, the second light-exiting region 109 extends along the first edge surface 104, the bottom side surface 103 and the second edge surface 105 of the optically transparent polymer plate 10. In the example shown in FIG. 8, the first light-exiting region 108 also extends along the first edge surface 104, the bottom side surface 103 and the second edge surface 105 of the optically transparent polymer plate 10.

In one embodiment, the first light-exiting region 108 and the second light-exiting region 109 can be formed by a CNC processing machine, an engraving machine, a laser processing machine or other processing equipment.

Figure 9:
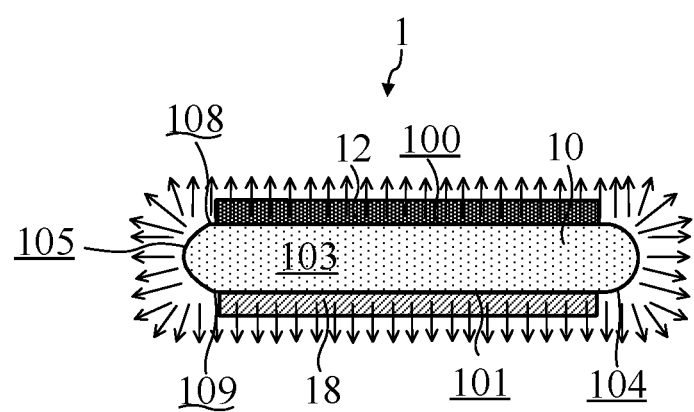
FIG. 9 is another side view of another modification of the indicating/alarming apparatus according to the preferred embodiment of the invention.

Referring to FIG. 9, FIG. 9 is a side view regarding the bottom side surface 103 of another modification of the indicating/alarming apparatus 1 according to the preferred embodiment of the invention.

As shown in FIG. 9, in one embodiment, the first edge surface 104, the bottom side surface 103 and the second edge surface 105 of the optically transparent polymer plate 10 respectively form a curved surface. By the viewing angle presented in FIG. 9, the first side surface 104 and the second side surface 105 both are curved surfaces such that the angle of light emission is wider. The components and devices in FIG. 9 identical to those shown in FIGS. 1 and 3 are given the same numerical notations, and will be not described in detail herein.

The indicating/alarming apparatus 1 according to the preferred embodiment of the invention has flexibility, and the light exits at a wide angle from the side surfaces of the indicating/alarming apparatus 1. Therefore, the indicating/alarming apparatus 1 of the invention can be fixed to a vehicle (for example, a bicycle) for alarming purposes. The indicating/alarming apparatus 1 of the invention can also be used as an indication for advertising signs and the like.

Figure 10:
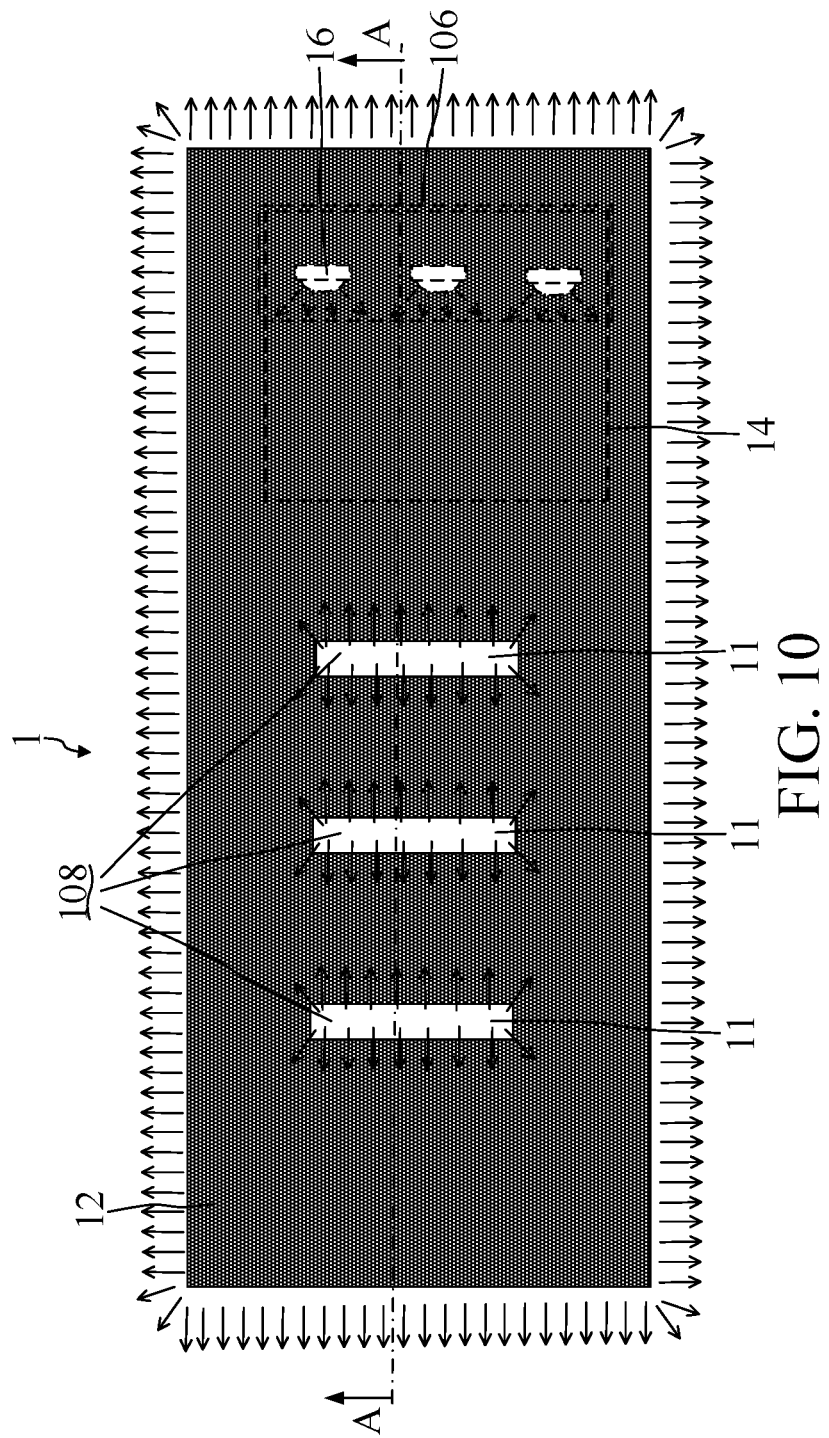
FIG. 10 is a top view of another modification of the indicating/alarming apparatus according to the preferred embodiment of the invention.
Figure 11:
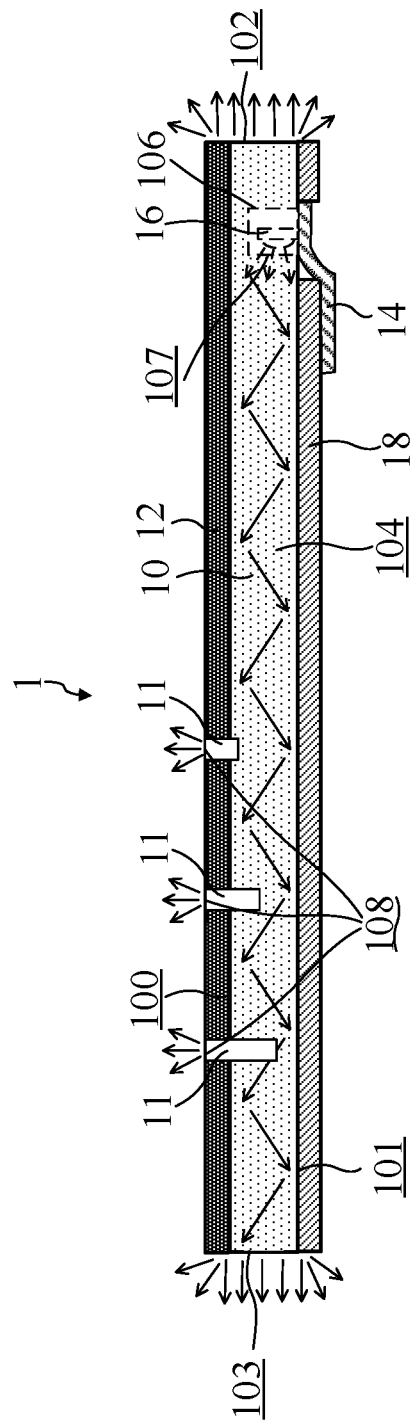
FIG. 11 is a cross sectional view of the indicating/alarming apparatus taken along the A-A line of FIG. 10.

Referring to FIGS. 10 and 11, those drawings schematically illustrate another modification of the indicating/alarming apparatus 1 according to the preferred embodiment of the invention. FIG. 10 schematically illustrates with a top view another modification of the indicating/alarming apparatus 1 according to the preferred embodiment of the invention. FIG. 11 is a cross sectional view of the indicating/alarming apparatus 1 taken along the A-A line of FIG. 10.

As shown in FIGS. 10 and 11, the first light-exiting region 108 corresponds to a pattern. Distinguishable from the prior arts, the indicating/alarming apparatus 1 according to the invention is modified to exhibit the pattern by the light-exiting region 108 to enhance the contrast between the pattern and other region. The indication/warning device 1 as shown in FIGS. 10 and 11 is advantageous for indication purposes.

The optically transparent polymer plate 10 has a plurality of recesses 11 corresponding to the pattern. Each recess 11 has a respective depth. The depths of the recesses 11 adjacent to the bottom side surface 103 of the optically transparent polymer plate 10 are deeper than those of the recesses 11 depart from the bottom side surface 103 of the optically transparent polymer plate 10. The difference in the depth of the recesses 11 is to control the amount of light exiting to make light exiting regarding each glyph or pattern uniform. By varying the depths of the plurality of recess 11, the illumination is controlled to be uniform at different locations in the particular pattern, and thereby the identifiability of the pattern can be enhanced. The components and devices in FIGS. 10 and 11 identical to those shown in FIGS. 1 and 3 are given the same numerical notations, and will be not described in detail herein.

Figure 12:
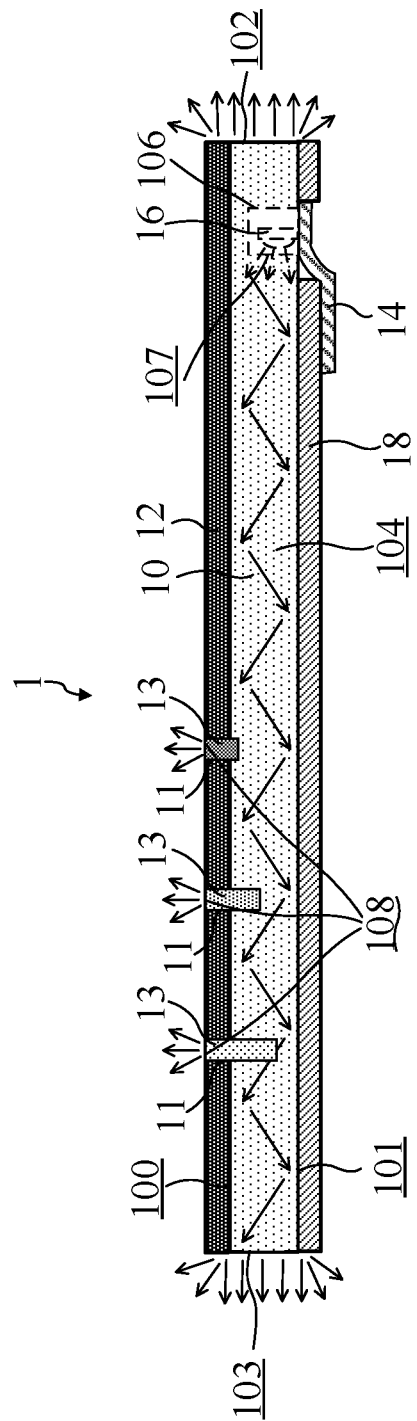
FIG. 12 is a side view of another modification of the indicating/alarming apparatus according to the preferred embodiment of the invention.

Referring to FIG. 12, FIG. 12 schematically illustrates with a side view another modification of the indicating/alarming apparatus 1 according to the preferred embodiment of the invention.

As shown in FIG. 12, further, the indicating/alarming apparatus 1 according to the invention also includes a plurality of colored translucent layers 13. The first light-exiting region 108 corresponds to a pattern. The optically transparent polymer plate 10 has plurality of recesses 11 corresponding to the pattern. The function of the plurality of recesses 11 is to destroy the total reflection of the upper surface 100 of the optically transparent polymer plate 10 to allow light to exit, and the overall appearance of the plurality of recesses 11 can present patterns and characters. Each colored translucent layer 13 corresponds to one of the recesses 11 and is filled in the corresponding recess 11. When the light passes through one of the colored translucent layers 13, the light is changed into a color light corresponding to said one colored translucent layer 13. Thereby, the specific pattern can emit a color light different from the original light according to the design, or emit a colorful color light. In one embodiment, the colored translucent layer 13 can be formed by doping the corresponding depressions 11 by doping a polymer colloid (for example, silicone) with wavelength-converting particles such as toner, phosphor powder or quantum dots, filing the doped polymer colloid in the corresponding recess 11, and then curing the doped polymer colloid in the corresponding recess 11.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An indicating/alarming apparatus, comprising:
    an optically transparent polymer plate, having an upper surface, a lower surface opposite to the upper surface, a top side surface, a bottom side surface opposite to the top side surface, a first edge surface, a second edge surface opposite to the first edge surface, and an opening formed on the lower surface, the opening being adjacent to the top side surface and having a light incident face;
    a light-shielding layer, formed to overlay the upper surface of the optically transparent polymer plate;
    a flexible circuit board;
    a plurality of light-emitting devices, soldered on the flexible circuit board, wherein the flexible circuit board is mounted on the lower surface of the optically transparent polymer plate such that the plurality of light-emitting devices are disposed within the opening of the optically transparent polymer plate, each light-emitting device emits a light entering from the light incident face of the opening into the optically transparent polymer plate which guides the light to exit from the top side surface, the bottom side surface, the first edge surface and the second edge surface, the light-shielding layer blocks the light from exiting from the optically transparent polymer plate; and a light-reflecting layer, being formed to overlay the lower surface of the optically transparent polymer plate and being for reflecting the light incident to the light-reflecting layer.

2. The indicating/alarming apparatus of claim 1, wherein the upper surface of the optically transparent polymer plate thereon defines a first light-exiting region, the light-shielding layer overlays the upper surface other than the first light-exiting region of the optically transparent polymer plate, the light is guided by the optically transparent polymer plate to also exit from the first light-exiting region.

3. The indicating/alarming apparatus of claim 2, wherein the lower surface of the optically transparent polymer plate thereon defines a second light-exiting region, the light-reflecting layer overlays the lower surface other than the second light-exiting region of the optically transparent polymer plate, the light is guided by the optically transparent polymer plate to also exit from the second light-exiting region.

4. The indicating/alarming apparatus of claim 3, wherein the first light-exiting region and the second light-exiting region respectively extend along the first edge surface, the bottom side surface and the second edge surface.

5. The indicating/alarming apparatus of claim 4, wherein the first edge surface, the bottom side surface and the second edge surface respectively form a curved surface.

6. The indicating/alarming apparatus of claim 2, wherein the first light-exiting region corresponds to a pattern, the optically transparent polymer plate has a plurality of recesses corresponding to the pattern, each recess has a respective depth, the depths of the recesses adjacent to the bottom side surface are deeper than those of the recesses depart from the bottom side surface.

7. The indicating/alarming apparatus of claim 1, wherein the light-shielding layer is formed of one selected from the group consisting of a dark ink layer, a leather layer, a wood layer, a first metal layer and a first polymer layer.

8. The indicating/alarming apparatus of claim 1, wherein the light-reflecting layer is formed of one selected from the group consisting of a light ink layer, a second metal layer and a second polymer layer.

9. The indicating/alarming apparatus of claim 2, wherein each the light-emitting device is a semiconductor light-emitting diode device or an organic light-emitting diode device.

10. The indicating/alarming apparatus of claim 2, further comprising a plurality of colored translucent layers, wherein the first light-exiting region corresponds to a pattern, the optically transparent polymer plate has plurality of recesses corresponding to the pattern, each colored translucent layer corresponds to one of the recesses and is filled in the corresponding recess, when the light passes through one of the colored translucent layers, the light is changed into a color light corresponding to said one colored translucent layer.

* * * * *